US005534585A

United States Patent [19]

Roulstone et al.

[11] Patent Number: 5,534,585
[45] Date of Patent: *Jul. 9, 1996

[54] POLYMER-MODIFIED PARTICULATE TITANIUM DIOXIDE

[75] Inventors: Brian J. Roulstone, Burnham; Julian A. Waters, Goring-on-Thames, both of England

[73] Assignee: Imperial Chemical Industries PLC, London, United Kingdom

[*] Notice: The term of this patent shall not extend beyond the expiration date of Pat. No. 5,412,019.

[21] Appl. No.: 295,103

[22] Filed: Aug. 24, 1994

Related U.S. Application Data

[63] Continuation of Ser. No. 189,279, Jan. 31, 1994, Pat. No. 5,412,019, which is a continuation of Ser. No. 995,010, Dec. 22, 1992, abandoned.

[30] Foreign Application Priority Data

Dec. 23, 1991 [GB] United Kingdom ............... 9127293

[51] Int. Cl.$^6$ .............. C08K 3/22; C08K 3/10; C08K 3/00; C08K 9/02
[52] U.S. Cl. .......... 524/497; 523/200; 523/205; 523/206; 524/413; 524/847
[58] Field of Search .................. 523/200, 205, 523/206; 524/413, 497, 847

[56] References Cited

U.S. PATENT DOCUMENTS

| | | | |
|---|---|---|---|
| 3,150,110 | 9/1964 | Becker, Jr. et al. | 524/497 |
| 4,025,483 | 5/1977 | Ramig, Jr. | 524/497 |
| 4,283,320 | 8/1981 | Carrol et al. | 524/497 |
| 4,771,086 | 9/1988 | Martin | 524/497 |
| 4,997,864 | 3/1991 | Waters | 427/221 |
| 5,385,960 | 1/1995 | Emmons et al. | 524/497 |
| 5,412,019 | 5/1995 | Roulstone et al. | 524/497 |

FOREIGN PATENT DOCUMENTS

| | | |
|---|---|---|
| 0392065 | 4/1989 | European Pat. Off. . |
| 0337672 | 10/1989 | European Pat. Off. . |
| 0439233 | 7/1991 | European Pat. Off. . |
| 2091120 | 12/1971 | France . |
| 0206664 | 8/1990 | Japan ................... 524/497 |
| 1346491 | 2/1974 | United Kingdom . |
| WO9312183 | 3/1993 | WIPO . |
| WO9312184 | 4/1993 | WIPO . |
| 0012183 | 6/1993 | WIPO . |
| 0012184 | 6/1993 | WIPO . |

OTHER PUBLICATIONS

Article in CRC Handbook of Chemistry and Physics by David R. Lide, Ph.D. pp. 1–20; 1–21.
European Search Report.

*Primary Examiner*—Peter A. Szekely
*Attorney, Agent, or Firm*—Cushman Darby & Cushman

[57] ABSTRACT

The tendency for hard and irregular particles of titanium dioxide pigment to adversely affect the sheen and coin mar resistance of a dried coating into which they have been incorporated is reduced by modifying the particles with polymer particles which have been preformed and are therefore of a more pre-determinable shape and size. The polymer particles are chemically bonded to a polymeric water-soluble compound containing moieties which are adsorbable onto the titanium dioxide particles so that on mixing a colloidally stabilised aqueous dispersion of the polymer particles with a colloidally stabilised aqueous dispersion of titanium dioxide particles, the moieties adsorb onto the titanium dioxide to form a colloidally stable aqueous dispersion of polymer-modified titanium dioxide which is useful in coating compositions.

20 Claims, 3 Drawing Sheets

POLYMER-MODIFIED PARTICULATE TITANIUM DIOXIDE

This is a continuation of Ser. No. 08/189,279, filed Jan. 31, 1994, now U.S. Pat. No. 5,412,019, which is a continuation of Ser. No. 07/995,010, filed Dec. 22, 1992, now abandoned.

This invention relates to polymer-modified particulate titanium dioxide, to a process for producing it and to coating compositions containing it.

Coating compositions (especially paints) generally comprise at least an organic film-forming material, a particulate pigment and a carrier liquid which evaporates as the coating composition dries. The film-forming material may be present either as a solution in the carrier liquid (e.g. the so-called "solvent-borne" paints) or as a colloidally stable dispersion of particles in the carrier liquid (e.g. the so-called "emulsion" or "latex" paints). The pigment is also present as an essentially colloidally stable dispersion of particles in the carrier liquid. As the carrier liquid evaporates, the film-forming material forms a film which binds pigment particles and any other non-volatile ingredients of the composition. Probably the most widely used pigment is particulate titanium dioxide which imparts both whiteness and opacity to the film of dried coating composition. Particulate titanium dioxide is used in the form of particles comprising (usually futile) titanium dioxide which are usually coated with up to as much as 20 wt % of hydratable inorganic oxides such as alumina, zirconia and/or silica. Conventionally the particles have a number average particle size of from 100 to 400 nm and they should be well dispersed in a coating composition.

The use of non-polymer-modified particulate titanium dioxide as a pigment results in an inevitable reduction in the sheen and coin mar resistance of the eventual dried film of coating composition. ("Coin mar" is the marking of a dried coating when the milled edge of a coin or similar metal object is rubbed against the surface of the coating). Reduction in sheen and coin mar occurs because the surfaces of the titanium dioxide particles are both highly irregular and hard and some of them are found in or just below the surface of the dried film where they are sufficiently accessible to adversely affect sheen and coin mar resistance. The titanium dioxide particles have sometimes been mixed with other particles, both organic and inorganic and especially other inorganic particles known as "extender" particles. Such mixing was done for various reasons including the purpose of spacing apart the titanium dioxide particles to inhibit their tendency to agglomerate in liquid dispersions. These other particles did not bond chemically to the surfaces of the titanium dioxide particles and so whilst they inhibited agglomeration, they did not affect the irregularity or hardness of the titanium dioxide surfaces and hence they did not lessen the reductions in sheen and coin mar resistance. On the contrary, many extender particles are themselves irregular and hard and so they actually aggravate the reductions in sheen and coin mar resistance.

More recently, proposals have been made to encapsulate titanium dioxide particles in organic polymer by for example polymerising monomer in water in the presence of the titanium dioxide particles and under conditions such that the polymer formed coats the surface of the particles. The polymer coating therefore creates a physical barrier around the particles which is firmly attached to the Particles. Two such proposals are made respectively in European Patent Specification EP 0 392 065A and in United States Patent Specification U.S. Pat. No. 4,771,086. The proposals have been primarily motivated by the desire to inhibit agglomeration and consequent loss of pigment efficiency which occurs if the surfaces of two adjacent unmodified titanium-dioxide particles closely approach each other. These earlier encapsulation proposals have sought to provide an essentially totally encapsulating polymer coating because total encapsulation by a thick coating of polymer prevents close approach of titanium dioxide particles and hence agglomeration of titanium dioxide particles is impossible. Provided that the polymer coating is thick enough, total encapsulation will also render the irregular and hard titaniumdioxide surface inaccessible to light or coins and so lessen the reductions in sheen and coin mar resistance. However total encapsulation by a polymer coating of a suitable thickness is wasteful of polymer because thick layers are needed. In addition, polymerisation in the presence of the titanium dioxide particles complicates a commercial polymerisation process in many ways. For example, the already expensive polymerisation vessel has to be fitted with means for handling abrasive dispersions of titanium dioxide particles. Also a large proportion of the capacity of the vessel is of course occupied by the titanium dioxide particles and so the volume available for the polymerisation reactants is much reduced leading to a corresponding loss in polymerisation capacity.

European Patent Specification EP 0 337 672A describes a process for modifying the surfaces of particles of titanium dioxide by polymerising monomer in water in the presence of titanium dioxide particles under conditions such that the polymer formed deposits only onto one or more small and separate portions of the particle surfaces but is nevertheless firmly attached to the titanium dioxide particles. The result is that the titanium dioxide particles are not fully encapsulated, but instead each carries one or more bonded nodules of polymer. In this way, use of the polymer can be more economical but at the cost of producing nodules whose shapes are irregular and unpredictable. EP 0 337 672A also remains dependant on a polymerisation performed in the presence of the titanium dioxide particles with its attendant disadvantages.

It is an object of this invention to inhibit the reduction in sheen and coin mar resistance which accompanies the use of particulate titanium dioxide as a pigment by providing polymer-modified particulate titanium dioxide which is not totally encapsulated in polymer yet which comprises polymer attached in relatively regular and predictable shapes. A further object is to attach the polymer to the surface without having to conduct a polymerisation in the presence of the particles of titanium dioxide.

Accordingly this invention provides a polymer-modified (including copolymer-modified) particulate titaniumdioxide comprising particles of organic polymer attached to particles containing titanium dioxide which titanium dioxide particles have a number average particle size (Dr) of from 100 to 400 nanometers nm and which polymer particles are of a particle size which allows them to be accommodated around the titanium dioxide particles wherein a) the particles of polymer are pre-formed prior to their attachment to the titanium dioxide particles, b) the particles are pre-formed either by (i) a free radical initiated aqueous emulsion or dispersion polymerisation performed in the presence of a water-soluble compound which during the course of the polymerisation bonds chemically to the polymer as it is being formed, or (ii) a polymerisation which is followed by the chemical bonding of a water-soluble compound to the polymer and c) the water-soluble compound is a polymeric material which is chemically bondable to the polymer, which contains at least one moiety adsorbable onto a surface of the titanium dioxide particles and preferably which has a weight average molecular weight of at least 1500 prior to attachment to the polymer.

Pre-formation of the polymer particles in the absence of the titanium dioxide particles results in the formation of predictably (usually essentially spherically) shaped solid particles having a pre-determinable range of particle sizes. Because the shape and size of the particles is predetermined before their attachment to the titanium dioxide particles, their ability to pack around the titanium dioxide particles is pre-determined by their preformed shape and size. In particular they do not touch or closely approach more than small proportion of the surfaces of the titanium dioxide particles but because of their regular shape and size, they provide maximum projection from those surfaces so that they are still able to lessen if not totally prevent the reductions in sheen and coin mar resistance consequent on introducing titanium dioxide particles into a coating composition. This enables polymer to be used very efficiently.

The polymer particles are attached to the titanium dioxide particles via the water-soluble compound which also contributes to the colloidal stability of an aqueous dispersion of the polymer-modified titanium dioxide particles by imparting at least some steric stabilisation. The water-soluble compound therefore serves as a coupling agent which brings and holds together the two different types of particle. It is not clear whether the water-soluble moieties make actual contact with the surfaces of the titanium dioxide particles or whether they are held very close to but spaced slightly apart from the surfaces. Presumably they would be held in such spaced relationship by a balance of ionic, steric and van der Waals' forces. However whatever the mechanism of attachment may be, the attachment is strong enough to enable the modified titanium dioxide particles to be present as a colloidally stable aqueous dispersion which retains very useful stability even when subjected to conditions (especially temperature variations) normally encountered in the manufacture, storage and use of water-borne paints.

The water-soluble compound must be chemically bonded to the polymer and preferably attachment is via a covalent bond though bonding via salt formation is possible. Covalent bonding is preferably achieved by choosing a water-soluble compound which generates a radical moiety when exposed to the action of free radicals generated by a free radical initiator during an aqueous polymerisation reaction used to form the polymer particles. This causes the water-soluble compound to bond to the polymer as it is being formed. Alternatively the water-soluble polymer may comprise a moiety which can be induced to chemically bond onto an already formed polymer. For example, the water-soluble compound may comprise a group (such as a carbon to carbon double bond) which likewise generates a radical moiety when exposed to the action of free radicals generated by irradiation or the decomposition of a compound which is decomposable to produce free radicals. It is also possible to chemically bond the water-soluble compound to an already formed polymer by means of pairs of co-reactive moieties, one member of a pair belonging to the water-soluble compound whilst the other member belongs to the polymer. Examples of co-reactive moiety pairs include epoxide/carboxylic acid pairs, epoxide/amine pairs and carboxylic acid/amine pairs, the latter pairs being examples of bonding by means of ionic salt formation.

Certain polymeric water-soluble compounds having a weight average molecular weight over 1500 are particularly suitable for use as water-soluble compounds since they generally comprise chains which are comfortably long enough to act as convenient coupling agents between the polymer particles and the titanium dioxide particles. Examples include polymers and co-polymers (including salts, analogues and derivatives) of the following monomers namely acrylamide, acrylic and methacrylic acids, hydroxyalkyl (especially hydroxyl ethyl) acrylates and methacrylates, aminoalkyl acrylates and methacrylates, vinyl pyridine, vinyl pyrrolidone, vinyl and styrene sulphonic acids. Particular polymeric water-soluble compounds contain chains of poly(ethylene imine), poly(ethyoxylate), poly(vinyl alcohol), cellulose ethers such as hydroxyalkyl celluloses (including hydrophobically modified variants), alkylhydroxyalkyl celluloses, carboxyalkyl celluloses and carboxyalkylhydroxy-alkyl celluloses. Still further polymeric water-soluble compounds include water-soluble or water-reducible polyesters and polyurethanes or starch derivatives such as acetates, hydroxyalkyl and carboxyalkyl starches or ionic starch derivatives such as phosphate, sulphate and aminoalkyl or polysaccharides such as xanthan and guar gum and gum arabic. Certain preferred water-soluble compounds have weight average molecular weights well in excess of 20 000 and include the water-soluble cellulose ethers such as hydroxyethyl cellulose, hydrophobically modified hydroxyethyl cellulose (especially when the number average particle size of the polymer particles is below 225 nm), and salts of carboxymethyl cellulose together with polymers and copolymers of acrylamide, vinyl alcohol, vinyl pyrrolidone and acrylic acid. Other preferred polymeric water-soluble compounds contain polyethoxylate chains having a weight average molecular weight of preferably from 1500 to 5000 which form esters with unsaturated carboxylic acid and of which poly(ethylene glycol) methacrylates are particularly useful examples. The water-soluble compounds quite often hinder homo-aggregation of the polymer-particles and contribute steric stabilisation to the colloidal stability of an aqueous dispersion of the polymer particles.

If the polymer particles are composed of a polymer whose minimum film-forming temperature is below 300K, it is preferred to choose a polymer whose surface characteristics are such that $$\frac{\gamma_{1-3} - \gamma_{1-2}}{\gamma_{2-3}} < \frac{1 - V_P^{2/3}}{V_t^{2/3}}$$

where $\gamma_{1-3}$ is the interfacial energy of the titanium dioxide particle surface/water interface $\gamma_{1-2}$ is the interfacial energy of the titanium dioxide particle surface/polymer interface $\gamma_{2-3}$ is the interfacial energy of the polymer particle surface/water interface and $V_p$ and $V_t$ represent the relative volumes of respectively, a polymer particle of the number average particle size $D_p$ and a titaniumdioxide particle of the number average particle size $D_t$ and $$V_P + V_t = 1 \text{ and } V_P = \frac{D_P^3}{D_P^3 + D_t^3}.$$

For convenience, the factor $(\gamma_{1-3}-\gamma_{1-2})/\gamma_{2-3}$ will be referred to as the "γ factor". By choosing a polymer whose surface characteristics allow its γ-factor to meet the above relationship, it is possible to reduce the proportion of the surface of the titanium dioxide particles which is touched by polymer after the attachment of the polymer particles which in turn means that the efficiency of utilisation of the polymer is increased. This is particularly so when the γ factor is less than zero. If a γ factor lies between 1 and −1 it can be conveniently measured by the technique described in United States Patent Specification U.S. 4,997,864 or European Patent Specification EP 0 327 199A, the contents of U.S. Pat. No. 4,997,864 is herein incorporated by reference. These references explain that by use of the Young-Dupré equation, the γ factor can be shown to be equal to the cosine of the contact angle (as shown in FIG. 4) for a particle 34 of polymer on a titanium dioxide surface 33 in water 30. The Young-Dupré equation is of course only valid if θ lies between 0° and 180°. It is explained in more detail on pages 24 and 25 of the book "Polymer Surfaces" by B W Cherry published in 1981 by Cambridge University Press and the contents of these pages are herein incorporated by reference. Accordingly for minimal touching of the surface by polymer, it is preferred that cos θ be less than zero which means that θ cannot be greater than just below zero. Total nondistortion of the polymer particles in water is ensured if the γ factor is equal to or less than −1 and total non-distortion means that the polymer particles when in water do not spread over the surfaces of the titanium dioxide particles.

The polymer particles may be particles of any organic polymer to which water-soluble compound can be chemically bonded. However it is convenient to choose particles of a polymer (including copolymer) obtainable by a free-radical initiated emulsion or dispersion polymerisation of monomers (including mixtures of monomers) which are polymerisable in water or a mixture of water and water-miscible insolvents such as aliphatic alcohols by means of a free-radical initiated reaction. The choice of free-radical initiated emulsion or dispersion polymerisations allows bonding of appropriate water-soluble compounds to take place conveniently during the polymerisation. The polymers may be either film-forming or non-film-forming at ambient temperatures, that is to say they may have a minimum film-forming temperature of either above or below 300K. Polymers having minimum film-forming temperature of below 275K are especially welcome because they avoid the need to add organic coalescing solvent to the water. Such solvent is becoming increasingly environmentally unwelcome. Examples of suitable monomers include vinyl esters, especially vinyl acetate or vinyl "Versatate"[1] also alkyl (especially methyl, ethyl and n-butyl) esters of unsaturated carboxylic acids such as acrylic or methacrylic or fumaric or maleic acids, unsaturated carboxylic acids such as acrylic or methacrylic acids, unsaturated acid anhydrides such as maleic anhydride, monovinylidine aromatics especially styrene, vinyl toluene or vinyl pyridine, alkenes and halogenated alkenes such as ethylene, propylene, vinyl chloride, vinylidene chloride and tetrafluorethylene, unsaturated nitriles, dienes and (for use only in copolymerisations) minor amounts of hydroxyl or amino alkyl (especially ethyl)esters of unsaturated carboxylic acids such as acrylic or methacrylic acids, [1]Vinyl "Versatate" is the vinyl ester of so-called "Versatic" acid which is a mixture of aliphatic monocarboxylic acids each containing an average of 9, 10 or 11 carbon atoms and is commercially available from the Shell Chemical Company of Carrington, England. epoxy compounds such as glycidyl methacrylate and also sulphonate. Examples of suitable free radical initiators include ammonium persulphate, azobis-isobutyronitrile, ammonium azobis-cyanovalerate dibenzoyl, peroxide, tertiary butyl peroxy-2-ethyl hexanoate and redox couples such as tertiary butyl hydroperoxide/sodium formaldehyde sulphoxylate, hydrogen peroxide/ascorbic acid, hydrogen peroxide/ferrous salt and systems comprising the cerium 4 cation $Ce^{4+}$ such as ceric ammonium nitrate In order to lessen the reductions in sheen and coin mar resistance, it is preferred to use certain number ratios of polymer particles to titanium dioxide particles. When the number average particle size Dp of polymer particles is larger than the number average particle size Dt of the titanium dioxide particles, (i.e. Dp is greater than Dt), the number ratio of polymer particles to titanium dioxide particles is desirably at least 3:1 and preferably at least 4:1. For titanium dioxide particles having a given number average particle size Dt which comprise a given volume fraction f of the combined volumes of the titanium dioxide particles and polymer particles, there is a preferred maximum permissable number average particle size, $Dp_{max}$ for the polymer particles which should not be exceeded. It is given by the equation:

$$DP_{max} = \frac{(1-f)}{f^{1/3}} \cdot \frac{Dt}{N^{1/3}}$$

where N is 3 or preferably 4 and
where $$f = \frac{[TiO_2]}{[TiO_2] + [Polymer]} = \text{volume fraction } TiO_2$$

and where [$TiO_2$] equals the total volume of titanium dioxide particles and [Polymer] equals the total volume of polymer particles in the modified titanium dioxide.

For example, if the number average particle size Dt of the titanium dioxide particles is 300 nm and their volume fraction f is 0.18, then the number average particle size Dp of the polymer particles must not exceed 345 nm and preferably it should not exceed 313 nm.

When the polymer particles are smaller than or equal in size with the titanium dioxide particles (i.e. Dp ≦ Dt), the number ratio of polymer particles to titanium dioxide 3.64 (D ]) particles should preferably exceed $$\frac{3.64}{20} \cdot \left(\frac{D}{Dp} + 1\right)^2 :1 \text{ or } 3:1$$

whichever gives the greater number of particles. Preferably this number ratio should exceed 3.64 < D)

$$\frac{3.64}{10} \cdot \left(\frac{D}{Dp} + 1\right)^2 :1 \text{ or } 4:1$$

whichever gives the greater number particles.

Many commercially useful colloidally stable aqueous dispersions of titanium dioxide particles contain particles whose number average particle size lies in the range 200 to 350 nm. It is preferred to select a balance of particle sizes and titanium dioxide weight fractions so that the number of polymer particles attached to each titanium dioxide particles is from 4 to 30 and such that the number average particle size of the polymer particles lies in the range 50 to 500 nm.

This invention also provides a process for producing a polymer-modified (including copolymer-modified) particulate titanium dioxide comprising particles of organic polymer attached to particles containing titanium dioxide in which process polymer is attached to titanium dioxide particles which are present as a colloidally stable aqueous dispersion and have a number average particle size (Dt) of from 100 to 400 nm wherein the process comprises a) providing in water a polymeric water-soluble compound which is chemically bondable to the polymer and which contains at least one moiety adsorbable onto the titanium dioxide particles and which preferably has a weight average molecular weight of at least 1500 prior to attachment to the polymer b) preparing a colloidally stable aqueous dispersion of polymer particles by
   (i) performing a free-radical initiated aqueous emulsion or dispersion polymerisation in the absence of titanium dioxide particles but in the presence of the water-soluble compound whereby water-soluble compound chemically bonds to the polymer as it is being formed or
   (ii) providing a colloidally stable aqueous dispersion of polymer particles and chemically bonding water-soluble compound onto them or
   (iii) chemically bonding water-soluble compound onto polymer particles and then colloidally stably dispersing the particles in water and c) mixing the colloidally stable aqueous dispersion of polymer particles with a colloidally stable aqueous dispersion of titanium dioxide particles whereupon on mixing, polymer particles spontaneously attach to particles of titaniumdioxide to produce a colloidally stable dispersion of the polymer-modified titanium dioxide particles.

In this way, polymer particles are pre-formed in the absence of titanium dioxide and then firm attachment of the pre-formed polymer particles to titanium dioxide particles is achieved without having needed to perform a polymerisation in the presence of the titanium dioxide particles.

The aqueous dispersions of polymer particles must be stable, that is to say they must be capable of remaining dispersed for at least 24 hours. Dispersions having this degree of stability are well known to the paint trade where they are referred to as colloidally stable emulsion polymers or latexes. Sometimes the presence of the chemically bonded water-soluble compound imparts sufficient steric stability to render polymer particles colloidally stable but often the presence of surfactants will be needed. Where the polymer dispersion is prepared by a polymerisation performed in the presence of the chemically bondable water-soluble compound, it is preferable to have surfactant present during the polymerisation. Preferable surfactants may be ionic or non-ionic. They generally have molecular weights of below 1500 and usually below 1000 and they do not chemically bond to the polymer particles. Di(ethyl hexyl) sodium sulphosuccinate is a suitable anionic surfactant and nonyl phenol poly(ethyoxylate)s with for example from 20 to 50 ethoxylate units are suitable non-ionic surfactants. Care should be taken to limit or avoid the presence of surfactants or any other material which is not chemically bonded to the polymer particles and which has an adsorbability onto the titanium dioxide particles which is similar to or greater than that of the adsorbable moieties of the bonded polymeric water-soluble compound. Failure to do so could in some circumstances result in an unacceptable reduction in the attachability of the water-soluble compound to the titanium dioxide particles. Fortunately it requires only a simple trial and error test to determine whether or to what extent the presence of any such non-bonded material is tolerable.

The colloidally stable aqueous dispersion of titanium dioxide particles used in the performance of this invention should preferably meet the standards customary in the paint trade. Aqueous coating compositions are customarily made using particles of titanium dioxide which are well dispersed since the effectiveness of the titanium dioxide particles increases with the quality of dispersion. Good dispersions can be obtained by choosing titanium dioxide particles having a number average particle size of 100 to 400 nm and dispersing them in water in the presence of the usual (preferably ionic and especially carboxylate containing) surfactants, and/or pigment dispersants using for example a high speed mixer. Many suitable pigment dispersants are commercially available but they are proprietary materials of unpublished composition. Many are anionic and may be simple acid or amine salts whereas others are polyelectrolytes having a weight average molecular weight of over 2,000. The most common anions are carboxylate, phosphate and occasionally sulphate. However cationic and non-ionic dispersants could also be used subject to the caution mentioned above that a non-ionic surfactant should not be too competitive in its absorbability onto the titanium dioxide particles. Where the titanium dioxide particles are coated with hydratable oxides, the choice of an appropriate dispersant will be influenced by the nature of the oxides. For example, if the hydratable oxide is alumina or alumina-rich, a suitable dispersant would be a sodium or ammonium salt of a polymer or copolymer containing polymerised unsaturated carboxylic acid such as acrylic acid, methacrylic acid or maleic anhydride optionally copolymerised with other unsaturated monomers. Polyphosphates may be used with silica or silica-rich coatings. The dispersions are customarily stable for at least 24 hours (though sometimes slow stirring may be required) and so they are usually described as "colloidally stable".

The stable dispersions of titanium dioxide particles may be mixed with the stable dispersions of polymer particles simply by pouring one dispersion into the other, preferably whilst stirring. Whether it is preferable to pour the titanium dioxide dispersion into the polymer dispersion or vice versa will depend on the natures of a particular pair of dispersions and so both sequences should be tried to determine the better. On mixing, polymer-modified particulate titanium dioxide forms spontaneously and provided that the two dispersions are themselves colloidally stable, a colloidally stable dispersion of polymer-modified titaniumdioxide particles will be formed. The stability of the polymer and titanium dioxide dispersions ensures that homo-aggregation of polymer particles and of titanium dioxide particles is hindered and usually substantially prevented whilst the presence of the adsorbable moieties in the attached water-soluble compound encourages heterocontact between polymer particles and titanium dioxide particles.

The titanium dioxide particles and polymer particles used in the performance of this invention will almost certainly have a range of particle sizes. This means that not all the titanium dioxide in a commercially available pigment will be modifiable in accordance with the invention and so the lessening in the reductions in sheen and coin mar resistance will not be total. Nevertheless, worthwhile improvements can be achieved. A plurality (for example 2 to 6) polymer-modified titanium dioxide particles may agglomerate together. This is not a disadvantage because their ability to lessen the reductions in sheen and coin mar resistance is not affected.

This invention further provides a coating composition containing the colloidally stable aqueous dispersion of polymer-modified particulate titanium dioxide. In particular the coating composition containing the dispersion may be an emulsion or latex paint. The coating composition may also contain conventional additional ingredients such as colourants, co-alescing solvents, antifoaming agents, biocides and extenders subject to the caution that extenders may have their own adverse effect on sheen and/or mar resistance. The coating composition may also comprise purposely added film-forming polymer and in fact such an addition will be essential if the modifying polymer is not or is not sufficiently film-forming at ambient temperatures such as 300K. In the case of emulsion or latex paints, the purposely added film-forming polymer will comprise a stable dispersion of polymer particles.

The coating composition may be made by mixing the colloidally stable dispersions of titanium dioxide particles and polymer particles dispersions together either in the absence of any other added particulate ingredients of the composition (in which case the modified titanium dioxide will contain no added inorganic particles other than titanium dioxide particles) or in the presence of some or all of them. Extender particles may interfere with the attachment of polymer particles to titanium dioxide particles but on the other hand, if the extender has a surface to which the adsorbable moiety of the water-soluble compound can attach, then the effect of this invention can also be used to lessen any reductions in sheen and mar resistance caused by irregular and/or hard surfaces on the extender or indeed any other irregular hard particulate ingredient. If the modified titanium dioxide is made in the absence of desirable added ingredients, then the stable dispersion of modified particles may be subsequently mixed with these other ingredients.

Examples of polymer-modified particulate titanium dioxide according to this invention are illustrated by the following description which refers to FIGS. 1 to 4 of the accompanying drawings of which FIG. 1 shows in diagrammatic section two examples of polymer-modified particulate titanium dioxide, FIG. 2 shows in diagrammatic section an example of polymer-modified particulate titaniumdioxide in which a plurality of modified titanium dioxide particles are agglomerated together, FIG. 3 shows an electron microscope photograph of modified titanium dioxide particles of the types illustrated by FIGS. 1 and 2.

Figure 1:
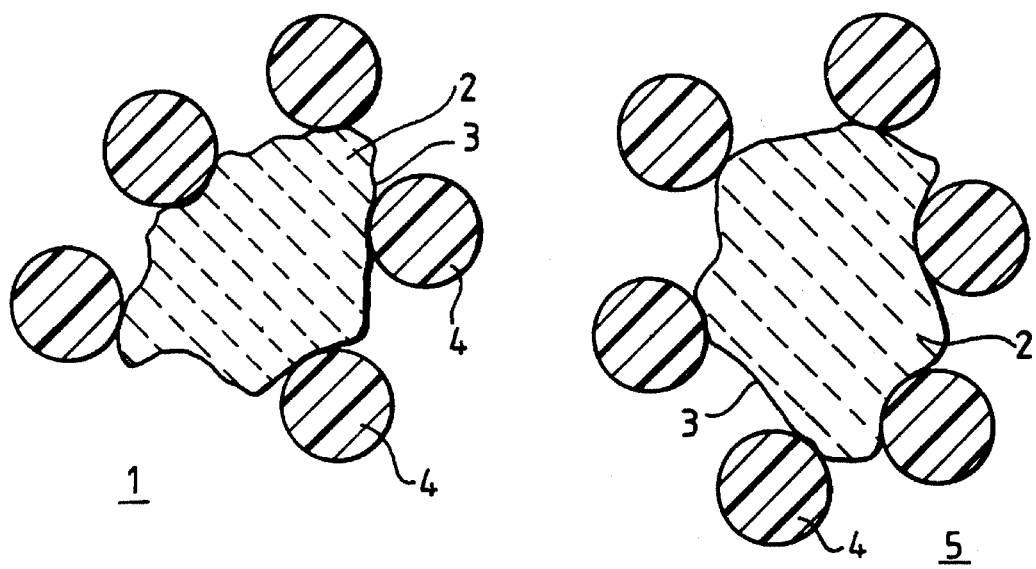

FIG. 1 shows examples 1 or 5 of polymer-modified particulate titanium dioxide comprising particles 4 of organic polymer attached to or to the vicinity of an irregular hard surface 3 of a particle 2 containing titanium dioxide. Each particle 4 touches or is close to only a small portion of surface 3 but offers the maximum projection available from a polymer particle made by an emulsion or dispersion polymerisation. Actual modified particles similar to modified particles 1 and 5 can be seen in FIG. 3.

Figure 2:
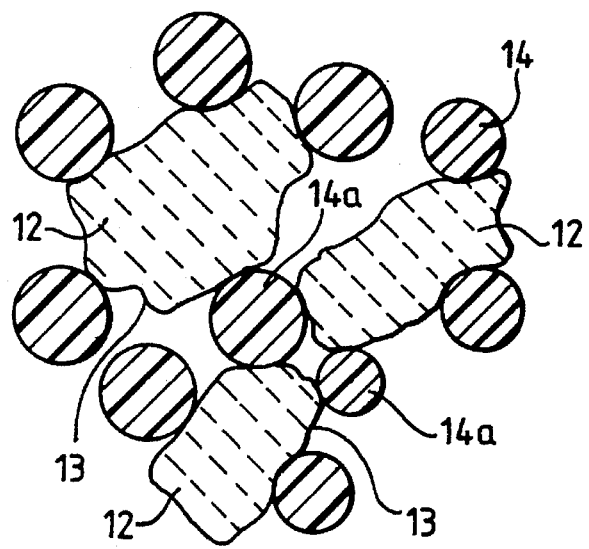

FIG. 2 shows an example 11 of polymer-modified titanium dioxide comprising particles 14 of organic polymer attached to or in the vicinity of irregular hard surfaces 13 of three titanium dioxide particles 12. Polymer particles 14a attach to more than one titanium dioxide particle 12 and so form an agglomerate. An actual agglomerate similar to agglomerate 11 can be seen in FIG. 3.

Figure 4:
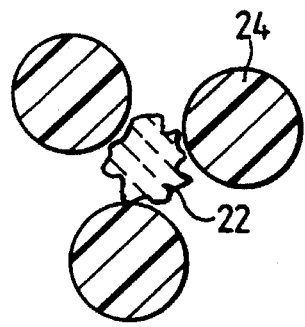
FIG. 4 shows in diagrammatic section an example of polymer modified particulate titaniumdioxide where the number average particle size (Dp) of the polymer particles is greater than the number average particle size of the titanium dioxide particles.

FIG. 4 shows an extreme example of a polymer-modified titanium dioxide in which the polymer particles 24 have a greater particle size than the titanium dioxide particle 22. All three polymer particles 24 have a particle size which just enables them to attach to the irregular hard surface of titanium dioxide particle 22. Again each polymer particle touches or is close to only a small area of the titanium dioxide surface.

Figure 5:
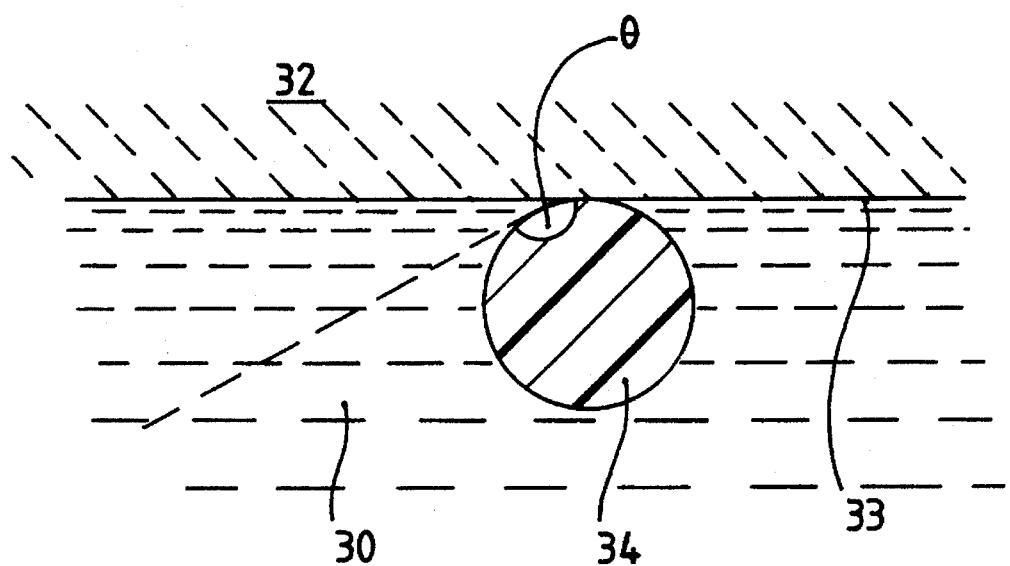
FIG. 5 shows the location of contact angle θ.

FIG. 5 shows the location of contact angle 8 for a particle 34 adjacent the surface 33 of a titanium dioxide particle 32 immersed in water 30.

The attachment of the polymer particles around the particles of titanium dioxide lessens the reduction in sheen and coin mar resistance caused by the presence of titanium dioxide particles in a dried film of coating composition. The viscosity of the coating composition is also improved as is the opacity and scrub resistance of the dried film.

The invention is further illustrated by the following Examples of which Examples A and B are comparative. In Examples, number average particle size is measured by using the Brookhaven disc centrifuge photodensitometer and the technique described in Brookhaven Instruction Manual I-DCPMAN, version of Feb. 1, 1988 supplied by Brookhaven Instrument Corporation of Holtsville, New York State, United States of America. The contents of this Manual are herein incorporated by reference. Minimum Film-Forming temperature is measured in accordance with ASTMTest 2354-91 and sheen is measured in accordance with ASTMTest D523-91 using light reflected at an angle of 60° to the surface of the paint and the contents of which tests are herein incorporated by reference. Coin mar resistance is estimated by drawing the milled edge of a British cupronickel coin across a dried film of coating composition under a load equal to the weight of a human hand. Experienced testers can discern the relative coin mar resistances of dried films in this way. No established quantitative technique is available.

EXAMPLE 1 AND COMPARATIVE EXAMPLE A

Demonstration of the Invention:

In order to demonstrate the invention, a colloidally stable dispersion of particulate titaniumdioxide was mixed with a colloidally stable dispersion of film-forming polymer particles having chemically bonded to them a polymeric water-soluble compound containing moieties adsorbable onto the titaniumdioxide particles. The stable dispersion of titanium dioxide, the stable dispersion of polymer particles and the paint will each be referred to as "Millbase 1", "Latex 1" and "Paint 1" respectively.

Preparation of Millbase 1:

A pigment dispersant and an antifoaming agent were stirred into water at ambient temperature (20° to 25° C.) whereupon they dissolved. The water and subsequent solution were contained in a 1 litre stainless steel container. The dispersant was a conventional anionic polyelectrolyte of the type recommended for use in dispersing titanium dioxide particles coated with alumina whilst the antifoaming agent was a conventional proprietary product also recommended for use in dispersions of titanium dioxide. The amounts used are shown in Table 1.

TABLE 1

| Ingredient | Parts by Weight |
| --- | --- |
| Water | 28.21 |
| Dispersant added as 40 wt % aqueous soln | 0.65 |
| Antifoaming Agent | 0.04 |
| Titanium Dioxide | 71.10 |
| Total | 100.00 |

Next a particulate titanium dioxide was dispersed into the solution with the aid of a high speed stirrer having a disc diameter of 6.25 cm. The titanium dioxide used was a conventional pigment grade having a number average particle size (after dispersion) of 210 nm in which the particles were coated with alumina and zirconia. The amount of titanium dioxide used is also shown in Table 1. The dispersion was performed by adding the particulate titanium dioxide slowly to the solution with the stirrer rotating initially at a speed of 1000 rpm (revolutions per minute). As the addition proceeded, the stirrer speed was increased gradually to 3000 rpm. After all the titanium dioxide had been added, the dispersion was stirred for a further 15 minutes at 3000 rpm so producing Millbase 1. Millbase 1 was found to have pH of 8 and an isoelectric point which occurred at a pH of between 5 and 6.

Preparation of Latex 1:

A water-soluble hydroxyethyl cellulose compound and a conventional non-ionic surfactant were dissolved in water at ambient (18° C.) temperature. The cellulose had a weight average molecular weight of about 150 000 and contained moieties (presumably hydroxyl moieties) which were adsorbable onto the titanium dioxide particles. It was available as "Natrosol" 250LR from Aqualon of Warrington, England. The non-ionic surfactant was a nonyl phenol poly(ethoxylate) comprising an average of 20 ethoxylate units per molecule. The water and subsequent solution were contained in a glass polymerisation vessel fitted with a stirrer, a reflux condenser and a pair of inlets for reactants. The amounts of cellulose and surfactant used and also the amounts of the various ingredients used in the copolymerisation described below are all shown in Table 2.

TABLE 2

| Ingredients | Parts by Weight | |
| --- | --- | --- |
| | Example 1 | Example A |
| Hydroxyethyl cellulose: water-soluble compound | 0.9 | None |
| Non-ionic surfactant as 80 wt % aqueous solution | 2.1 | 2.1 |
| Water | 53.75 | 54.05 |
| Vinyl Acetate | 34.0 | 34.5 |
| Vinyl Versatate | 8.5 | 8.6 |
| Anionic Surfactant | 0.5 | 0.54 |
| Ammonium Persulphate: Initiator | 0.25 | 0.21 |
| Total | 100.00 | 100.00 |
| Fraction, "f" of TiO$_2$ particles | 0.18 | 0.18 |
| Polymer particle size: nm | <225 | <225 |

A mixture consisting of 80 wt % vinyl acetate and 20 wt % vinyl versatate co-monomers was made and an anionic surfactant was dissolved in it. The anionic surfactant was an aqueous solution consisting 25 wt % of water and 75 wt % di(ethyl hexyl) sodium sulphosuccinate. The aqueous solution of cellulose and non-ionic surfactant made above was then heated to 80° to 85° C. The polymerisation vessel was flushed with nitrogen and then maintained under an atmosphere of nitrogen. The stirrer was started and the mixture of co-monomers containing the dissolved surfactant was added to the solution via one of the vessel inlets at a steady rate over a period of two hours. Simultaneously with the addition of the co-monomers, an aqueous solution of ammonium persulphate initiator was also added to the solution via the other inlet, again at a steady rate over two hours. A copolymerisation occurred which formed an at least partially sterically stabilised colloidally stable dispersion of film-forming particles of vinyl acetate/vinyl versatate copolymer onto which chains of hydroxyethyl cellulose had chemically bonded. After a further 30 minutes the dispersion was cooled to ambient temperature, stirring was stopped and the solution was filtered to remove extraneous solid material. The filtrate consisted of the colloidally stable dispersion of film-forming copolymer particles with hydroxyethyl cellulose chains chemically bonded to them. This stable dispersion will be referred to as "Latex 1". The copolymer particles had a number average particle size of below 225 nm.

Preparation of "Paint 1":

The pH of Latex 1 was raised to 8.0 by the addition of aqueous ammonia. Then 32.84 parts by weight of Millbase 1 were stirred into 67.16 parts by weight of the alkaline Latex 1 so producing a paint (Paint 1) in which the volume fraction f of the titanium dioxide was 0.18. On stirring in the millbase, a spontaneous attachment of copolymer particles to titaniumdioxide particles occurred to produce a colloidally stable dispersion of polymer-modified particulate titanium dioxide. On application of a 200 μm thick coating of Paint 1 to a flat surface and allowing the paint to dry for 24 hours at ambient temperature, a dried film of paint was obtained which showed improved sheen and coin mar resistance as compared with Comparative Example A. The viscosity of the paint and the opacity and scrub resistance of the dried film were also improved.

Comparative Example A:

For the purposes of Comparative Example A, the procedure of Example 1 was repeated except that the hydroxyethyl cellulose water-soluble compound was omitted from the latex and consequent minor adjustments to the amount of other ingredients were made as shown in Table 2. Omission of the cellulose led to a dried paint film with much poorer sheen and coin mar resistance than that of Example 1.

EXAMPLES 2 AND 3

Demonstration of Alternative Film-Forming Polymers and an Alternative Cellulose

The procedure of Example 1 was repeated except that in the case of Example 2, the co-monomers were methyl methacrylate and 2-ethylhexyl acrylate and the watersoluble cellulose compound was a sodium carboxy methylcellulose and in the case of Example 3, the comonomers were vinyl acetate and butyl acrylate but in this case the cellulose remained hydroxyethyl cellulose as in Example 1. The sodium carboxy methylcellulose used in Example 2 had a weight average molecular weight of over 20 000 and was available from Aqualon as "Blanose" 7L2C. It is believed that at least the carboxy moieties are adsorbable onto the titanium dioxide particles. The precise amounts of ingredients used in making the latexes of film-forming copolymer are shown in Table 3. Paints obtained were applied as 200 μm thick coatings to flat surfaces where they dried over a period of 24 hours at ambient temperatures to give dried films having improved sheen and coin mar resistance. The viscosities of the paints and the opacity and scrub resistances of the dried films were also improved.

TABLE 3

| Ingredient | Parts by Weight | |
|---|---|---|
| | Example 2 | Example 3 |
| Hydroxyethyl Cellulose | None | 0.9 |
| Sodium Carboxy Methyl Cellulose | 0.2 | None |
| Non-ionic Surf. as 80 wt % soln. | 1.7 | 2.0 |
| Water | 59.7 | 54.8 |
| Vinyl Acetate | None | 33.2 |
| Methyl Methacrylate | 19.4 | None |
| Butyl Acrylate | None | 8.3 |
| 2-Ethylhexyl Acrylate | 18.6 | None |
| Anionic Surfactant | 0.2 | 0.5 |
| Ammonium Persulphate Initiator | 0.2 | 0.3 |
| Total | 100.00 | 100.00 |
| Fraction "f" of $TiO_2$ particles | 0.18 | 0.18 |
| Polymer Particle size nm | 165 | 248 |
| Minimum film-forming temperature of polymer, K | <300 | 286 |

EXAMPLE 4 AND COMPARATIVE EXAMPLE B

Demonstration of the Suitability of Polyvinyl Alcohol as an Alternative Water-soluble Compound:

A latex which will be referred to as Latex 4 was made by copolymerising vinyl acetate and vinyl versatate in the presence of a polyvinyl alcohol using the following procedure:

11.9 parts by weight (ppw) of an aqueous solution consisting of 7.5 wt % of a polyvinyl alcohol of weight average molecular weight 180 000 and 2 ppw of the 80 wt % aqueous solution of the non-ionic surfactant used in Example 1 were dissolved at ambient temperature (20° to 25° C.) in 37.5 ppw of water contained in a glass polymerisation vessel fitted with a stirrer, reflux condenser and inlets for reactants. The vessel was flushed with nitrogen and then maintained under an atmosphere of nitrogen. The stirrer was started, the solution was heated to 80° C. and a solution consisting of 0.08 ppw ammonium persulphate free radical initiator in 0.8 ppw of water was added. Then feeds of 33.3 ppw vinyl acetate, 8.3 vinyl versatate, 0.5 ppw anionic surfactant and a solution consisting of 0.16 ammonium persulphate, 0.1 ppw sodium bicarbonate and 3.14 ppw water were each added at a steady rate over a period of two hours. A copolymerisation occurred which formed a colloidally stable dispersion of film-forming particles of vinyl acetate/vinyl versatate copolymer with which chains of polyvinyl alcohol had chemically bonded. A further initiator solution was added, this time consisting of 0.05 ppw ammonium persulphate in 0.5 ppw water and stirring was continued for a further 30 minutes and then the dispersion was allowed to cool to ambient temperature whereupon stirring was stopped. The dispersion was filtered to remove extraneous material and the filtrate was found to consist of the colloidally (at least partially sterically) stable dispersion film-forming copolymer particles bonded to polyvinyl alcohol water-soluble compound which will be referred to as Latex 4. The copolymer particles in Latex 4 had a number average particle size of 290 nm, a minimum film-forming temperature of 287K and the hydroxyl groups of the polyvinyl alcohol were adsorbable onto the titanium dioxide particles of Millbase 1. The pH of Latex 4 was adjusted to 8 as in Example 1.

A paint (Paint 4) was made by stirring 28 ppw of Millbase 1 into 71.3 ppw of Latex 4 to give a titanium dioxide particle volume fraction "f" of 0.18. On stirring in the millbase, a spontaneous attachment of copolymer particles to titanium-dioxide particles occurred to produce a colloidally stable dispersion of polymer-modified particulate titanium dioxide. A coating 200 μm thick of Paint 4 was applied to a flat surface and allowed to dry for 24 hours at ambient temperature whereupon a dried film of paint was obtained which showed improved sheen and coin mar resistance as compared with Comparative Example B. The viscosity of Paint 4 and the opacity and scrub resistance of the dried film were also improved.

For the purposes of Comparative Example B, the procedure of Example 4 was repeated except that the polyvinyl alcohol ingredient was omitted from the preparation of the latex and replaced by 14 ppw of water. The vinyl acetate feed was increased to 34 ppw but otherwise no material changes were made. The dried coat of paint obtained had significantly poorer sheen and coin mar resistance as compared with that of Example 4.

EXAMPLE 5

Demonstration of the Suitability of Polyacrylamide as an Alternative Water-Soluble Compound:

A latex which will be referred to as Latex 5 was made by copolymerising vinyl acetate and vinyl versatate in the presence of a polyacrylamide obtained by an in situ polymerisation. The following procedure was used:

0.6 parts by weight (ppw) of the anionic polyelectrolyte dispersant used in Example 1, 1.6 ppw of the 80 wt % aqueous solution non-ionic surfactant also as used in Example 1 and 1.5 ppw acrylamide were dissolved at ambient temperature (20° to 25° C.) in 48.8 ppw water contained in a glass polymerisation vessel fitted with a stirrer, reflux condenser and inlets for reactants. The vessel was fluxed with nitrogen and then maintained under an atmosphere of nitrogen. The stirrer was started and the solution was heated to 55° C. 0.07 ppw of tertiary butyl hydroperoxide free radical initiator dissolved in 0.36 ppw water were added to the heated solution followed by 0.07 ppw of sodium formaldehyde sulphoxylate dissolved in 0.9 ppw water and the temperature of the contents of the vessel rose to 60° C. indicating exothermic polymerisation of the acrylamide. The temperature was maintained at 60° C. for 50 minutes and then 25.0 ppw vinyl acetate, 6.2 ppw vinyl versatate and 0.65 ppw tertiary butyl hydroperoxide were each added at a steady rate over a period of two hours simultaneously with a steady addition of a solution of 0.65 ppw sodium formaldehyde sulphoxylate and 3 ppw of the nonionic surfactant in 10.9 ppw water. A copolymerisation occurred which formed a colloidally stable dispersion of film-forming particles of vinyl acetate/vinyl versatate copolymer with which chains of polyacrylamide had chemically bonded. The dispersion was allowed to cool to ambient temperature, stirring was stopped and the cooled dispersion was filtered. The filtrate was found to consist of the colloidally (at least partially sterically) stable dispersion of film-forming copolymer particles bonded to polyacrylamide water-soluble compound which will be referred to as Latex 5. The copolymer particles in Latex 5 had a number average particle size of 290 nm, a minimum film-forming temperature of 287K and at least the amido groups of the polyacrylamide were adsorbable onto the titanium dioxide particles of Millbase 1. The pH of Latex 5 was adjusted to 8 as in Example 1.

A paint (Paint 5) was made by stirring 28.8 ppw of Millbase into 71.3 ppw of Latex 5 to give a volume fraction "f" of titanium dioxide particles of 0.18. On stirring in the millbase, a spontaneous attachment of copolymer particles to titaniumdioxide particles occurred to produce a colloidally stable dispersion of polymer-modified particulate titanium dioxide. A coating 200 μm thick of Paint 5 was applied to a flat surface and allowed to dry for 7 days at ambient temperature whereupon a dried film of paint was obtained which showed improved sheen and coin mar resistance together with improved viscosity in Paint 5 and improved opacity and scrub resistance in the dried film.

EXAMPLE 6

Demonstration of the Suitability of Polyvinyl Pyrrolidine as an Alternative Water-Soluble Compound:

Essentially the procedure of Example 5 was repeated but using poly(vinyl pyrrolidone) as the water-soluble compound instead of polyacrylamide, using butyl acrylate as a co-monomer instead of vinyl versatate and using a slightly modified millbase. The millbase and latex obtained will be referred to as Millbase 6 and Latex 6.

Preparation of Millbase 6:

Various water-soluble ingredients as specified in Table 4 were dissolved in water contained in a 1 litre stainless steel container at ambient temperature (20° to 25° C.). The dispersant and antifoaming agent were the same as used in Millbase 1 and the cellulose was similar to that used in Latex 1 but was in fact "Cellosize" QP 300 available from Union Carbide (UK) Limited of Rickmansworth, England. The biocide was a conventional fungicide sold

TABLE 4

| Ingredient | Parts by Weight |
| --- | --- |
| Water | 26.86 |
| Dispersant as 40 wt % aqueous soln. | 0.7 |
| Hydroxyethyl cellulose | 0.2 |
| Antifoaming agent | 0.04 |
| *NP50 Non-ionic surfactant | 3.9 |
| Biocide | 0.1 |
| Titanium dioxide particles | 68.2 |
| Total | 100.0 |

*The non-ionic surfactant was an aqueous solution consisting of 20 wt % water and 80 wt % of nonyl phenyl ethoxylate containing 50 ethoxylate units per molecule.

for use in dispersions of titanium dioxide particles. The titanium dioxide particles used were the same as used in Millbase 1 and were in fact dispersed into the above solution of water-soluble ingredients using the same dispersion technique as used for Latex 1. The dispersion of titanium dioxide particles obtained was found to have a pH of 8 and an isoelectric point which occurred at a Ph of between 5 and 6.

Preparation of Latex 6:

0.3 parts by weight (ppw) of the anionic polyelectrolyte dispersant used in Example 1, 1.6 ppw of the non-ionic surfactant solution quoted at the foot of Table 4, 0.1 ppw of the cellulose "Cellosize" QP 300 and 2.8 ppw vinyl pyrrolidone were dissolved at ambient temperature (20° to 25° C.) in 54.8 ppw water contained in a glass polymerisation vessel fitted with a stirrer, reflux condenser and inlets for reactants. The vessel was fluxed with nitrogen and then maintained under an atmosphere of nitrogen. The stirrer was started and the solution was heated to 55° C. 0.05 ppw of tertiary butyl hydroperoxide free radical initiator dissolved in 0.05 ppw water were added to the heated solution followed by 0.06 ppw of sodium formaldehyde sulphoxylate dissolved in 0.5 ppw water and the temperature of the contents of the vessel rose to 60° C. indicating exothermic polymerisation of the vinyl pyrrolidone. The temperature was maintained at 60° C. for 50 minutes and then 19.1 ppw vinyl acetate, 8.2 ppw butyl acrylate and 0.6 ppw tertiary butyl hydroperoxide were each added at a steady rate over a period of two hours simultaneously with a steady addition of a solution of 0.6 ppw sodium formaldehyde sulphoxylate and 3 ppw of the nonionic surfactant used in Example 1 dissolved in 7.3 ppw water. A copolymerisation occurred which formed a colloidally stable dispersion of film-forming particles of vinyl acetate/butyl acrylate copolymer with which chains of polyvinyl pyrrolidone had chemically bonded. The dispersion was allowed to cool to ambient temperature, stirring was stopped and the cooled dispersion was filtered. The filtrate was found to consist of the colloidally (at least partially sterically) stable dispersion of film-forming copolymer particles bonded to polyvinyl pyrrolidone water-soluble compound. The filtrate which will be referred to as Latex 6. The copolymer particles in Latex 6 had a number average particle size of 90 nm, a minimum film-forming temperature of 285K and at least one or other of the amino or carbonyl groups of the polyvinyl pyrrolidone were adsorbable onto the titanium dioxide particles of Millbase 6. The pH of Latex 6 was adjusted to 8 as in Example 1.

A paint (Paint 6) was made by stirring 28.8 ppw of Millbase into 71.3 ppw of Latex 6 to give a fraction "f" of titanium dioxide particles of 0.18. On stirring in the millbase, a spontaneous attachment of copolymer particles to titanium dioxide particles occurred to produce a colloidally stable dispersion of polymer-modified particulate titanium dioxide. A coating 200 μm thick of Paint 6 was applied to a flat surface and allowed to dry for 24 hours at ambient temperature whereupon a dried film of paint was obtained which showed improved sheen and coin mar resistance together with improved viscosity in Paint 6 and improved opacity and scrub resistance in the dried film.

EXAMPLE 7

Demonstration of the Use of Polymer of High Minimum Film-Forming Temperature, of Ultrasonic Dispersion and of a Water-Soluble Compound containing Polyethylene Glycol Chains:

A latex (which will be referred to as "Latex 7") containing particles of a copolymer of methyl methacrylate and ethyl acrylate which had a minimum film-forming temperature of well above ambient temperatures was mixed using ultrasonic vibration with a slightly modified version of Millbase 1 which modified version will be referred to as "Millbase 7".

Preparation of Millbase 7:

Millbase 7 was prepared using the same ingredients and techniques as used in the preparation of Millbase 1 but the quantities of ingredients used were as specified in Table 5. The number average titanium dioxide particle diameter was 300 nm.

TABLE 5

| Ingredient | Parts by Weight |
| --- | --- |
| Water | 29.9 |
| Dispersant | 0.3 |
| Titanium Dioxide | 69.8 |
| Total | 100.00 |

Preparation of Latex 7:

Firstly a polymeric water-soluble compound was made by copolymerising 50 parts by weight (ppw) of methoxy poly-(ethoxylate) methacrylate having a weight average molecular weight of 200 000 with 45 ppw butyl acrylate and 5 ppw glycidyl methacrylate and subsequently modifying the copolymer obtained by reacting some of its glycidyl groups with acrylic acid. The copolymerisation was performed in ethanol at 78° C. under reflux using azobis-isobutyronitrile as the free radical initiator. Copolymerisation was continued for 4 hours and then the product was allowed to cool to ambient temperature (20° to 25° C.). Sufficient acrylic acid and oxirane-ring opening catalyst (N-coconut-N,N dimethylamine) were added to react with 75% of the glycidyl groups in the copolymer together with 0.01 ppw hydroquinone and then the mixture was re-heated to 78° C. under reflux and maintained at that temperature for 3 days with a slow bleed of air through the mixture. The modified product was then allowed to cool back to ambient temperature and the resulting ethanolic solution contained 41 wt % of the modified copolymer which was the polymeric water-soluble compound comprising poly(ethoxylate) chains adsorbable onto the particulate titanium dioxide of Millbase 7 and pendant acrylate moieties which are chemical bondable to other polymer via their carbon to carbon unsaturation.

Next 21.8 ppw of the above ethanolic solution containing 8.9 ppw of the water-soluble compound were dissolved at ambient temperature in 1140 ppw of water contained in a glass polymerisation vessel fitted with a stirrer, reflux condenser and inlets for reactants. The vessel was fluxed with nitrogen and then maintained under an atmosphere of nitrogen. The stirrer was started and the solution was heated to 80° C.

73.9 ppw methyl methacrylate, 26.1 ppw ethyl acrylate 1.5 ppw azobis-isobutyronitrile free radical initiator were added to the polymerisation vessel and its temperature was maintained at 80° C. for 4 hours. A copolymerisation occurred which involved not only the methyl methacrylate and the ethyl acrylate but also the water-soluble compound and produced a colloidally stable dispersion of non-film-forming particles of essentially methyl methacrylate/ethyl acrylate copolymer with which the water-soluble compound had copolymerised. The dispersion was allowed to cool to ambient temperature, stirring was stopped and the cooled dispersion was filtered. The filtrate was found to consist of the colloidally sterically stable dispersion of non-film-forming copolymer particles which derived of their steric stability from poly(ethoxylate) chains pendant from the particles. The copolymer particles had a number average particle size of 80 nm, and a minimum film-forming temperature of 333K. The pH of Latex 7 was adjusted to 8 as in Example 1.

Preparation of Paint 7:

56.3 ppw of Latex 7 were poured into a 1 litre glass beaker and stirred using a magnetic follower. Over a period of 90 minutes whilst stirring was continued, 50 ppw of Millbase 7 were slowly added from a syringe pump to the latex whereupon polymer particles spontaneously attached to titanium dioxide particles. A fluid, colloidally and sterically stabilised aqueous dispersion of polymer modified particulate titanium dioxide was obtained which did however show some tendency for modified particles to agglomerate. Accordingly, the dispersion was then subjected no 10 minutes of ultrasonic vibration to reduce the amount of agglomeration. This de-agglomerated dispersion contained a fraction "f" of titanium dioxide particles which was 0.67.

Figure 3:
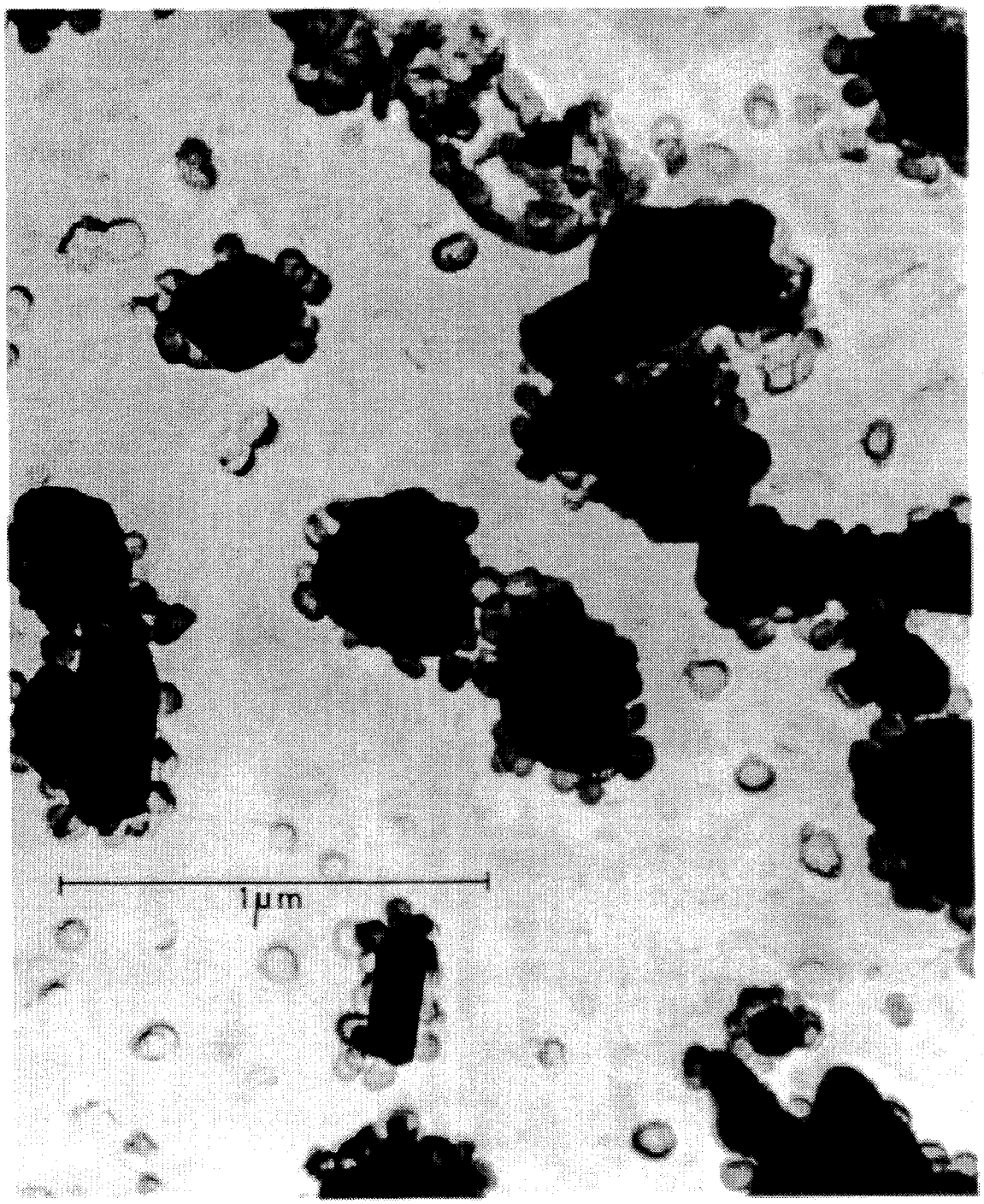

The nature of the polymer-modified particulate titanium dioxide could be seen in both transmission electron microscope photographs and in scanning electron microscope photographs. As shown in FIG. 3, some polymer particles could be seen arranged around the surfaces of individual titanium dioxide particles as indicated in FIG. 1 of the drawings and some were present in agglomerates as indicated in FIG. 2. It could not be seen whether the polymer particles actually touched the titanium dioxide surfaces or whether they were slightly spaced from them, however virtually no distortion of the essentially spherical shapes of the particles had occurred. The number ratio N of polymer particles to titanium dioxide particles was approximately 25:1 which compares with a value of about 80:1 for maximum number $N_{SAT}$ which could be accommodated as a monolayer around the titanium dioxide particles, that is to say $$N_{SAT} \approx 3.64 \cdot \left( \frac{Dt}{Dp} + 1 \right)^2 \approx 80.$$

Paint 7 was prepared by mixing the dispersion of deagglomerated polymer-modified particulate titanium dioxide with an amount of acrylic film-forming latex comprising methyl methacrylate/ethyl hexyl acrylate/acrylic acid polymer sufficient to reduce the volume fraction "f" of titanium dioxide particles to 0.18. A coating 200 μm thick of Paint 7 was applied to a flat surface and allowed to dry for 7 days at ambient temperature whereupon a dried film of paint was obtained which showed improved sheen and coin mar resistance together with an improved viscosity for Paint 7 and improved opacity in the dried film.

EXAMPLE 8

Demonstration of Non-spreading Nature of Polymer Particles on the Pigment Surface in the Presence of Water A paint (which will be referred to as Paint 8) was made by mixing a millbase as in Example 7 with a latex (which will be referred to as Latex 8) comprising particles of a copolymer of vinyl acetate and vinyl versatate to which chains of methoxypoly(ethylene oxide) of approximate molecular weight 2000, were chemically bonded.

In order to make Latex 8, 2.0 parts by weight (ppw) of a non-ionic nonyl phenol poly(ethylene oxide) surfactant of molecular weight 1100 and 7.5 ppw of methoxy poly(ethylene oxide) methacrylate of weight average molecular weight of 2100) were added to 420 ppw water, the temperature raised to 50° C. and the solution purged with nitrogen. Then 80 ppw vinyl acetate and 20 ppw vinyl versarate were added. This was followed by addition of a aqueous mixture comprising 1.5 ppw azobiscyanovaleric acid, 7.5 ppw ethanol, 2.7 ppw of 2 molar ammonium hydroxide solution and 5.2 ppw water. The temperature was raised and maintained at 80° C. Nitrogen purging and stirring were maintained throughout. A copolymerisation occurred which involved not only the vinyl acetate and vinyl versatate but also the methoxy poly(ethylene oxide) methacrylate and produced a colloidally stable dispersion of film-forming particles of essentially vinyl acetate/vinyl versarate copolymer with which the methoxy poly(ethylene oxide) methacrylate had copolymerised. The dispersion was allowed to cool to ambient temperature, stirring was stopped and the cooled dispersion was filtered. The filtrate was found to consist of the colloidally sterically stable dispersion of film-forming copolymer particles which derive their steric stability from poly(ethylene oxide) chains pendant from the particles. The copolymer particles had a number average particle size of 290 nm and a minimum film-forming temperature of 288K.

A large proportion of the poly(ethylene oxide) chains were chemically bonded to the surface of the polymer particles. The pH of Latex 8 was adjusted to 8 as in Example 1.

In order to make Paint 8, 300 ppw of Latex 8 and 53 ppw of Millbase 8 were mixed with vigorous stirring and slow addition of the millbase to the latex over 30 minutes. The whole procedure was performed at 25° C. The volume fraction "f" of titanium dioxide particles in the dispersion was 0.15. The number ratio N of polymer particles to titanium dioxide particles was approximately 6:1.

The product was a fluid, colloidally stable dispersion of polymer-modified particulate titanium dioxide which possessed steric stabilisation. This was confirmed by the following simple test.

A volume of the dispersion was added to an equal volume of a 5% calcium chloride solution. The mix was shaken and left for 24 hours. No flocculation was observed. A sample of the unmodified titanium dioxide particles alone was subjected to the same test and showed immediate flocculation when mixed with the salt solution.

Scanning electron microscopy showed that the polymer particles had not spread over the titanium dioxide particles and so only overlay a very small portion of surfaces of the titanium dioxide particles. This accorded with a test that showed that the γ factor had a value of less than or equal to −1. The test was performed according to the Test Method described in EP 0 327 199A or U.S. Pat. No. 4,997,864 using butyl acetate as the solvent whose surface energy has a close similarity to that of the vinyl acetate/vinyl versate copolymer.

EXAMPLE 9

Demonstration of the use of a Cationic Dispersant for the Titanium Dioxide Particles:

A millbase (which will be referred to as "Millbase 9") was made up according to the procedure used for Millbase 8 but with the following modifications:

The anionic pigment dispersant was replaced by a cationic dispersant which was dodecyltrimethyl ammonium bromide and antifoaming agent was included. The amounts of the various ingredients of Millbase 9 are shown in Table 6. The ultrasonic vibration was started just prior to the addition of the titanium dioxide to the solution of the other components and the addition was carried out evenly over a period of 15 minutes. The ultrasonic vibration was continued for a further 2½× minutes. The dispersion of titanium dioxide particles obtained had cationic colloidal stability.

TABLE 6

| Ingredient | Parts by Weight |
| --- | --- |
| Water | 126 |
| Cationic Dispersant | 2.3 |
| Antifoaming Agent | 0.03 |
| Titanium Dioxide | 50 |
| Total | 100.00 |

A latex (which will be referred to as "Latex 9") was prepared using the procedure employed to make Latex 7. Latex 9 was identical with Latex 7 except for the fact that the number average particle size of its particles was only 77 nm instead of 80 nm presumably owing to some adventitious variation in polymerisation conditions or particle size measuring procedure.

A paint (which will be referred to as "Paint 9") was made by pouring 167.7 parts by weight (ppw) of Latex 9 into a 1 litre beaker and then subjecting it to ultrasonic vibration at 25° C. 12.9 ppw of Millbase 9 was added to the latex over a period of 30 minutes whilst the vibration and temperature of 25° C. were maintained. Scanning electron microscopy confirmed that polymer particles had attached spontaneously around the titanium dioxide particles. The aqueous dispersion of polymer-modified particulate titanium dioxide obtained was found to be colloidally sterically stable.

We claim:

1. A polymer-modified (including copolymer-modified) particulate titanium dioxide comprising particles of organic polymer attached to particles of titanium dioxide, the particles of titanium dioxide having a number average particle size (Dt) of from 100 to 400 nm, and the polymer particles having a particle size which allows them to be accommodated around the titanium dioxide particles, wherein a) the polymer particles are pre-formed prior to their attachment to the titanium dioxide particles, b) the polymer particles are pre-formed either by, i) a free radical initiated aqueous emulsion or dispersion polymerization performed in the presence of a water-soluble compound which bonds chemically to the polymer as it is being formed, or ii) a polymerization which is followed by the chemical bonding of the water-soluble compound to the polymer, and c) the water-soluble compound is a polymeric material which i) has a weight average molecular weight of at least 1500 prior to bonding to the polymer, ii) is chemically bondable to the polymer and which contains at least one moiety adsorbable onto the titanium dioxide particles, and iii) is chosen from the group consisting of celluloses, cellulose ethers, polymers and copolymers of acrylamide, vinyl alcohol, vinyl pyrrolidone and acrylic acid, and polymers containing poly(ethoxylate) chains.

2. A modified titanium dioxide as claimed in claim 1 wherein the particles of titanium dioxide were obtained from an aqueous dispersion containing a dispersant selected from the group consisting of the salts of a polymer or copolymer containing polymerized unsaturated carboxylic acid monomers optionally copolymerized with other unsaturated monomers.

3. A modified titanium dioxide as claimed in claim 2 wherein the unsaturated carboxylic acid monomers are selected from the group consisting of acrylic acid, methacrylic acid and maleic anhydride.

4. A modified titanium dioxide as claimed in claim 1 wherein the cellulose or cellulose ether is a hydroxyethyl cellulose, a carboxylmethyl cellulose or a hydrophobically modified hydroxyl ethyl cellulose.

5. A modified titanium dioxide as claimed in claim 1 wherein the number average particle size of the polymer particles is less than 225 nm.

6. A modified titanium dioxide as claimed in claim 1 wherein the preformed polymer has a minimum film-forming temperature of at least 300K.

7. A modified titanium dioxide as claimed in claim 1 wherein the preformed polymer has a minimum film-forming temperature of below 300K.

8. A modified titanium dioxide as claimed in claim 7 wherein the polymer has a minimum film-forming temperature of less than 275K.

9. A modified titanium dioxide as claimed in claim 1 wherein the modified titanium dioxide contains no inorganic particles other than those comprised in the pigment grade titanium dioxide.

10. A modified titanium dioxide as claimed in claim 1 wherein the modified titanium dioxide is associated with other inorganic particles modified by attachment of the same polymer particles.

11. A process for producing a polymer-modified (including copolymer-modified) particulate titanium dioxide comprising particles of organic polymer attached to particles of titanium dioxide, the titanium dioxide particles having a number average particle size (Dt) of from 100 to 400 nm and being colloidally stably dispersed in water containing a dispersant selected from the group consisting of the salts of a polymer or copolymer containing polymerized unsaturated carboxylic acid monomers optionally copolymerized with other unsaturated monomers wherein, the process comprises the steps of:

a) providing in water a water-soluble compound which is a polymeric material which i) has a weight average molecular weight of at least 1500 prior to bonding to the polymer, ii) is chemically bondable to the polymer and which contains at least one moiety adsorbable onto the titanium dioxide particles, and iii) is chosen from the group consisting of celluloses, cellulose ethers, polymers and copolymers of acrylamide, vinyl alcohol, vinyl pyrrolidone and acrylic acid and polymers containing poly(ethoxylate) chains;

b) preparing a stable aqueous dispersion of polymer particles by i) performing a free-radical initiated aqueous emulsion or dispersion polymerization in the absence of the titanium dioxide particles but in the presence of the polymeric water-soluble compound whereby the water-soluble compound chemically bonds to the polymer as it is being formed, or ii) providing a colloidally stable aqueous dispersion of the polymer particles and chemically bonding the water-soluble compound onto the polymer particles, or iii) chemically bonding the water-soluble compound onto the polymer particles and then colloidally stably dispersing the particles in water; and c) mixing the colloidally stable aqueous dispersion of polymer particles with the colloidally stable aqueous dispersion of titanium dioxide particles whereupon on mixing the polymer particles spontaneously attach to the titanium dioxide particles to produce a colloidally stable dispersion of the polymer-modified titanium dioxide particles.

12. A process as claimed in claim 11, wherein the unsaturated carboxylic acid monomers are selected from the group consisting of acrylic acid, methacrylic acid and maleic anhydride.

13. A process as claimed in claim 11 wherein the polymer particles in the colloidally stable aqueous dispersion are stabilized with the help of a non-ionic surfactant which is not chemically bonded to the polymer and which is less adsorbable onto the titanium dioxide particles than are the adsorbable moieties of the water-soluble compound.

14. A process according to claim 11 wherein the mixing of the stable dispersions is performed in the absence of inorganic particles other than those present in the pigment grade titanium dioxide.

15. A process according to claim 11 wherein the stable polymer dispersion is provided with a pH of at least 2 pH units above the isoelectric point of the stable dispersion of titanium dioxide particles.

16. A coating composition containing polymer-modified particle titanium dioxide as claimed in claim 1.

17. A coating composition containing polymer-modified particulate titanium dioxide made according to a process as claimed in claim 11.

18. A coating composition as claimed in either claim 16 or claim 17 wherein the titanium dioxide particles comprise from 10 to 35% by volume of the total solids content of the composition.

19. A coating composition as claimed in either claim 16 or claim 17 wherein the composition contains colloidally stably dispersed particles of film-forming polymer unattached to titanium dioxide particles.

20. A coating composition according to claim 16 wherein the polymer-modified particle titanium dioxide is modified by polymer having a minimum film-forming temperature of above 300K.

* * * * *